(12) United States Patent
Barker et al.

(10) Patent No.: US 6,233,252 B1
(45) Date of Patent: May 15, 2001

(54) TRANSFER OF VERY LARGE DIGITAL DATA FILES VIA A FRAGMENTATION AND REASSEMBLY METHODOLOGY

(75) Inventors: Keith R. Barker, Belmont; Mark T. Rafter, Los Gatos; Andrew D. Routley, Mountain View; Matthew B. Ashe, Manteca, all of CA (US)

(73) Assignee: CyberStar, L.P., Palo Alto, CA (US)

( * ) Notice: Subject to any disclaimer, the term of this patent is extended or adjusted under 35 U.S.C. 154(b) by 0 days.

(21) Appl. No.: 09/249,889

(22) Filed: Feb. 16, 1999

(51) Int. Cl.$^7$ ....................................... H04J 3/24
(52) U.S. Cl. ............................. 370/473; 370/474
(58) Field of Search .................... 370/229, 231, 370/235, 236, 466, 469, 470, 471, 473, 474, 476, 390, 394, 428; 707/1, 205

(56) References Cited

U.S. PATENT DOCUMENTS 5,337,313 * 8/1994 Buchholz et al. ................ 370/94.1

OTHER PUBLICATIONS

Stallings, Data and Computer Communications, pp.176–186, 306, 1997.*
Comer, Internetworking with TCP/IP, pp. 92–98, 1997.*

* cited by examiner

*Primary Examiner*—David R. Vincent
(74) *Attorney, Agent, or Firm*—Kenneth W. Float

(57) ABSTRACT

Systems and methods for transferring very large data files to a remote location. The systems and methods fragment the very large data file into smaller ordered blocks using file conversion software loaded onto a computer processor. The ordered fragmented files or blocks transmitted to the remote location using a data distribution system. For example, the data distribution system may include a transmitter, a satellite transmission link, and a receiver at each remote location. At each remote location, received ordered fragmented files or blocks are reassembled in accordance with the original ordering scheme using file conversion software loaded on a computer. This produces the original very large data file. Once the very large data file is reassembled, it may be processed or archived.

10 Claims, 1 Drawing Sheet

TRANSFER OF VERY LARGE DIGITAL DATA FILES VIA A FRAGMENTATION AND REASSEMBLY METHODOLOGY

BACKGROUND

The present invention relates generally to the distribution of very large data files, and more particularly, to systems and methods for transferring very large data files, such as feature length movies, for example, using a fragmentation and reassembly methodology.

Conventional motion pictures are produced and distributed to motion picture theaters by preparing a film that is physically shipped to the theaters and then displayed to an audience using a conventional motion picture projector. Although it is in its infancy, technology is being developed that will permit recording of motion pictures using digital cameras.

However, currently available personal computers are limited as to the size of files that can be transferred to them. Typical 32-bit personal computers can only transfer data files that have a file size less than $2^{32}$ bits. Feature length movies are very large data files, and are typically more than 4 gigabytes in size. Such data files cannot be readily transferred between computers.

The present inventors attempted to use numerous existing software packages to transfer and reassemble a very large data file. However each of these existing software packages failed to transfer very large data files. This is because the personal computer on which the software was run could only transfer data files that have a file size less than $2^{32}$ bits. None of the existing software packages could transfer a very large data file exceeding 4 gigabytes in size.

Accordingly, it would be advantageous to have systems and methods for transferring very large data files using currently available 32-bit computers. It would also be advantageous to have systems and methods for transferring very large data files using a fragmentation and reassembly methodology. It would also be advantageous to have systems and methods for use in digitally distributing very large data files containing feature length movies.

SUMMARY OF THE INVENTION

The present invention provides for systems and methods for transferring very large data files to a remote location. The present invention involves fragmentation and reassembly of the very large data files, which permits their transfer between 32-bit computers, for example.

Such very large data files include digitally recorded motion pictures that are transferred to motion picture theaters for display. For example, a digitally recorded motion picture file containing a feature length movie, for example, may be transferred between a production or distribution facility to theaters at which the motion picture is to be played. The very large data files, such as motion picture files, are typically over 4 gigabytes in size.

The present systems and methods fragment the very large data file into smaller files or blocks, 500 megabytes in size, for example, that are numbered or ordered, to provide an indication of the original ordering of the data. This is achieved by processing the very large data file using file conversion software loaded on a computer. The ordered fragmented files or blocks (such as smaller blocks of the motion picture file) are transmitted to and are received at the remote location. For example, the fragmented files or blocks of the motion picture file may be transferred by way of a satellite transmission link to each motion picture theater that is to display the motion picture.

At the remote location, the received fragmented files or blocks are reassembled or reconstructed into the original very large data file using the file conversion software. For example, at each motion picture theater, received fragmented blocks of the motion picture file are reconstructed to produce the digitally recorded motion picture file.

Once the very large data file is reassembled, it is processed or archived. For example, the reconstructed motion picture file may be transferred to a digital projector to display the motion picture to an audience.

The file conversion software comprises a file fragmentation utility employed in a computer at the transmitting end of the system that segments the very large data file into a plurality of smaller blocks or files. A file reassembly utility is employed in a computer at the receiving end of the system. The file reassembly utility reconstructs the original file by concatenating each of the smaller files or blocks in accordance with the original ordering scheme to produce the original data file.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
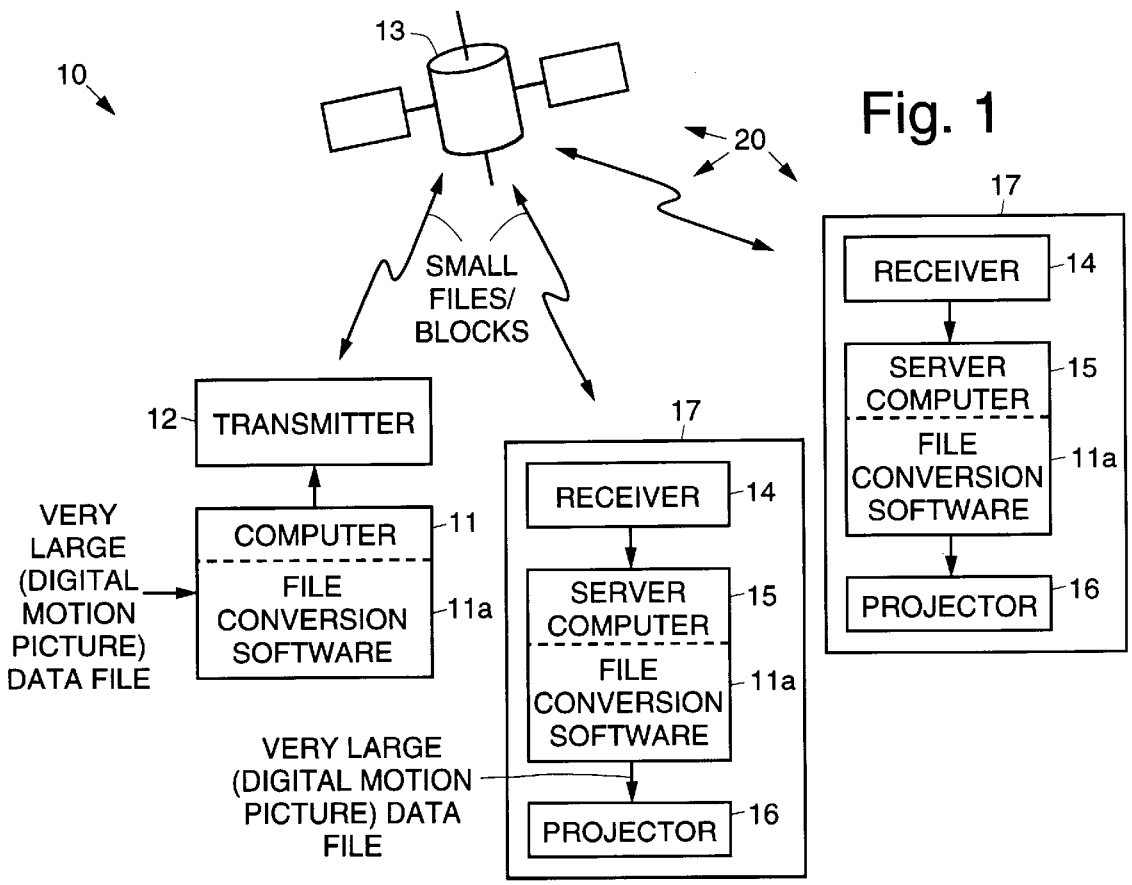
FIG. 1 illustrates an exemplary system for transferring very large data files in accordance with the principles of the present invention.

Referring to the drawing figures, FIG. 1 illustrates an exemplary system 10 for transferring very large data files in accordance with the principles of the present invention. The system 10 is used to transfer very large data files, such as a digitally recorded motion picture file containing a feature length movies, for example.

The very large data files, such as a digitally recorded motion picture file, for which the present invention is used, is typically over 4 gigabytes in size. By way of example, the system 10 may be advantageously used to transfer the digitally recorded motion picture files between a production or distribution facility and theaters at which the motion picture is to be played.

The system 10 fragments the very large digital file into smaller files or blocks, such as 500 megabyte files or blocks, for example. The fragmented files or blocks are numbered or ordered, to provide an indication of the original ordering of the data. This is achieved by processing the file using file conversion software 11a loaded into a computer processor 11 or computer 11, such as a Windows® NT computer 11, for example, at a transmitting location. The ordered, fragmented files or blocks, such as the fragmented motion picture file, are transmitted by way of a data distribution system 20 to one or more remote locations 17. The data distribution system 20 may comprise a transmitter 12, a satellite transmission link 13, for example, and a receiver 14 located at each remote location 17. For example, the data distribution system 20 may be advantageously used to transfer a fragmented motion picture file to remotely located motion picture theaters 17 that are to display the motion picture.

At each remote location 17 (motion picture theater 17), the received fragmented files or blocks of the very large data file are received by the receiver 14 and processed by a computer 15 or server computer 15 such as a Windows® NT computer 15, for example. The server computer 15 contains file conversion software 11a that is used to reassemble or reconstruct the fragmented files or blocks in accordance with the original ordering scheme to produce the original very large data file, such as the digitally recorded motion picture file. Once the very large data file (digital motion picture file) is reconstructed using the file conversion software 11a, it may be archived or processed in any desired manner. For example, the reconstructed digital motion picture file may be transferred to a digital projector 16 so that it may be displayed to an audience.

Figure 2:
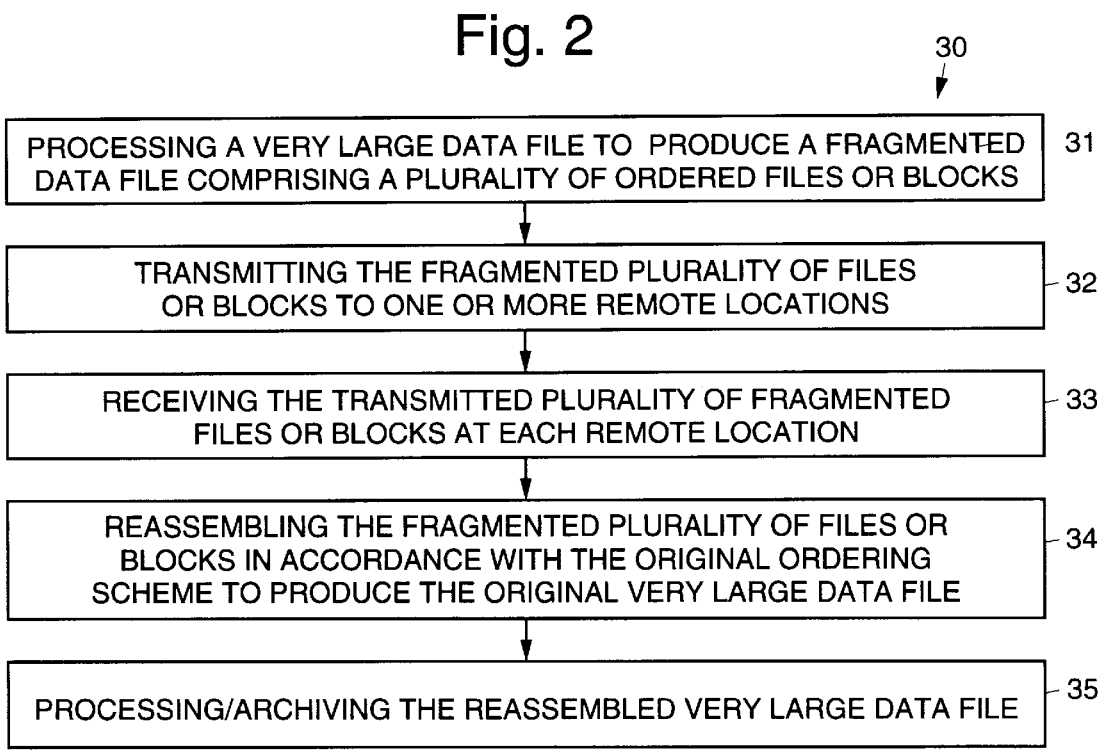
FIG. 2 is a flow diagram illustrating an exemplary embodiment of a fragmentation and reconstruction method for transferring very large data files in accordance with the principles of the present invention.

Referring now to FIG. 2, it is a flow diagram illustrating an exemplary embodiment of a fragmentation and reconstruction method 30 for transferring very large data files in accordance with the principles of the present invention. The method 30 comprises the following steps.

The method 30 processes a very large data file having a size on the order of 4 gigabytes or more, for example. The very large digital file is fragmented 31 into smaller files or blocks using file conversion software 11a loaded into a computer 11 as a transmitting location. The fragmented files or blocks are numbered or ordered, to provide an indication of the original ordering of the data. The smaller files or blocks may have a size on the order of 500 megabytes, for example. The fragmented files or blocks are transmitted 32 to a remote location 17. For example, fragmented files or blocks comprising a motion picture file may be transmitted 32 by way of a data distribution system 20, for example, to one or more motion picture theaters 17. The fragmented files or blocks are received 33 at the remote location 17.

After reception, the fragmented files or blocks are reassembled 34 by means of concatenation, for example, to reconstruct the original very large data file in accordance with the original ordering scheme. This is achieved using the file conversion software 11a disposed on a computer 15 at the remote location 17. For example, fragmented blocks of a motion picture file may be reassembled 34 to produce the original digitally recorded motion picture file. After reconstruction of the original data file, it is processed 35 or archived 35 in a desired manner. For example, the reconstructed digital motion picture file may be transferred 35 to a digital projector at each theater (remote location 17) so that the motion picture may be displayed to an audience.

The file conversion software 11a used in the present system 10 and method 30 comprises a file fragmentation utility on the computer 11 at the transmitting end of the system 10 that segments the very large data file into a plurality of smaller files or blocks. A file reassembly utility comprising the file conversion software 11a is employed in the server computer 15 at the receiving location 17. The file reassembly utility combines and reassembles (reconstructs) the original data file by concatenating each of the smaller files or blocks in accordance with the original ordering scheme to produce the original very large data file.

Thus, systems and methods that may be used to transfer very large data files using a fragmentation and reassembly technique have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A system for transferring a very large data file, comprising:

a computer located at a first location;

file conversion software loaded into the computer for processing a very large data file having a size larger than the native file size addressability of the computer located at the first location to fragment it into a plurality of smaller data files or blocks;

a data distribution system for broadcasting the fragmented plurality of smaller data files or blocks to a remote location; and file conversion software disposed on a computer located at the remote location that reassembles the fragmented plurality of data files or blocks to reconstruct the original very large data file.

2. The system recited in claim 1 wherein the fragmented files or blocks are ordered, to provide an indication of the original ordering of the data.

3. The system recited in claim 2 wherein the file conversion software reassembles the fragmented plurality of data files or blocks in accordance with the original ordering scheme to reconstruct the original very large data file.

4. The system recited in claim 1 wherein the remote location comprises one or more data file receiving locations.

5. The system recited in claim 1 wherein the remote location comprises one or more data file receiving locations.

6. A method for transferring a very large data file, comprising the steps of:

fragmenting a very large data file into a plurality of smaller data files or blocks, which very large data file has a size larger than the native file size addressability of a computer used to fragment the file;

transmitting the fragmented plurality of smaller data files or blocks to a remote location;

receiving the fragmented plurality of smaller data files or blocks at the remote location; and reassembling the fragmented plurality of smaller data files or blocks to reconstruct the original very large data file.

7. The method recited in claim 6 wherein the step of fragmenting a very large data file comprises the step of ordering the fragmented files or blocks to provide an indication of the original ordering of the data.

8. The method recited in claim 7 wherein the step of reassembling the fragmented plurality of smaller data files or blocks comprises the step of reassembling the fragmented plurality of data files or blocks in accordance with the original ordering scheme to reconstruct the original very large data file.

9. The method recited in claim 6 wherein the remote location comprises one or more data file receiving locations.

10. The method recited in claim 6 wherein the remote location comprises one or more data file receiving locations.

* * * * *